United States Patent
Watanabe et al.

(10) Patent No.: US 9,782,897 B2
(45) Date of Patent: Oct. 10, 2017

(54) ROBOT SYSTEM USING A VISION SENSOR

(71) Applicant: FANUC CORPORATION, Yamanashi (JP)

(72) Inventors: Atsushi Watanabe, Yamanashi (JP); Yuuki Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/241,143

(22) Filed: Aug. 19, 2016

(65) Prior Publication Data

US 2017/0057088 A1 Mar. 2, 2017

(30) Foreign Application Priority Data

Aug. 31, 2015 (JP) ................................ 2015-170971

(51) Int. Cl.
*G05B 15/00* (2006.01)
*B25J 9/16* (2006.01)

(52) U.S. Cl.
CPC .......... *B25J 9/1674* (2013.01); *B25J 9/1697* (2013.01); *G05B 2219/40202* (2013.01); *G05B 2219/40203* (2013.01); *Y10S 901/47* (2013.01); *Y10S 901/49* (2013.01)

(58) Field of Classification Search
CPC ........ B25J 9/1674; B25J 9/1697; B25J 19/06; G05B 2219/40202; G05B 2219/40203; F16P 3/142; Y10S 901/47; Y10S 901/49
USPC ................................ 700/247, 255, 259, 262
See application file for complete search history.

(56) References Cited

U.S. PATENT DOCUMENTS

| | | | | |
|---|---|---|---|---|
| 3,588,865 A | * | 6/1971 | Hansen ................. | G08B 13/22 340/384.7 |
| 4,652,205 A | * | 3/1987 | Ross ..................... | B25J 19/021 250/221 |
| 4,668,940 A | * | 5/1987 | Beard .................... | G08B 19/00 340/500 |
| 4,795,957 A | * | 1/1989 | MacNeal, Jr. ......... | B25J 9/1676 200/334 |
| 4,804,860 A | * | 2/1989 | Ross ..................... | B25J 19/021 250/221 |

(Continued)

FOREIGN PATENT DOCUMENTS

JP H05-077179 A 3/1993
JP H07229596 A 8/1995

(Continued)

*Primary Examiner* — Khoi Tran
*Assistant Examiner* — Jorge Peche
(74) *Attorney, Agent, or Firm* — Hauptman Ham, LLP

(57) ABSTRACT

In a robot system, a signal output unit outputs, depending on a processing result of an image processing unit, an entry preparation signal indicating an entry preparation state, and an entry permission signal for permitting a person to enter a predetermined section in a case where the person has been requested to enter the predetermined section. The entry preparation signal is outputted when the stopping of the operation of the robot is detected, and thereafter, when the person requests to enter the predetermined section, an instruction to stop the operation of the robot, or an instruction to stop the operation of the robot as well as an instruction to stop a portion of the robot system which is necessary to enable the person to enter therein, are outputted, and the entry permission signal is outputted.

12 Claims, 6 Drawing Sheets

(56) References Cited

U.S. PATENT DOCUMENTS

| | | | | |
|---|---|---|---|---|
| 5,280,622 A * | 1/1994 | Tino | ............ | B25J 19/06 700/255 |
| 6,236,906 B1 * | 5/2001 | Muller | ............ | B25J 9/1676 403/13 |
| 6,856,862 B1 * | 2/2005 | Feltner | ............ | G01V 8/20 250/221 |
| 7,254,841 B1 * | 8/2007 | Nelson | ............ | A41D 13/0012 2/102 |
| 7,293,323 B1 * | 11/2007 | Hoce | ............ | A47L 7/0009 15/321 |
| 7,486,997 B2 * | 2/2009 | Muneta | ............ | G05B 19/058 700/2 |
| 9,513,606 B1 | 12/2016 | Larsen | ............ | G05B 9/02 |
| 9,649,766 B2 * | 5/2017 | Stubbs | ............ | B25J 9/1666 |
| 9,671,523 B2 * | 6/2017 | Gelineau | ............ | G01V 8/20 |
| 2001/0041077 A1 * | 11/2001 | Lehner | ............ | G01V 8/10 396/661 |
| 2002/0082803 A1 * | 6/2002 | Schiffbauer | ............ | F16P 3/145 702/159 |
| 2002/0175831 A1 * | 11/2002 | Bergan | ............ | G08G 1/095 340/908.1 |
| 2002/0186299 A1 * | 12/2002 | Cofer | ............ | F16P 3/142 348/152 |
| 2003/0076224 A1 * | 4/2003 | Braune | ............ | F16P 3/144 340/500 |
| 2004/0125206 A1 * | 7/2004 | Lohmann | ............ | B25J 9/1674 348/155 |
| 2004/0182995 A1 * | 9/2004 | Braune | ............ | F16P 3/142 250/221 |
| 2005/0207618 A1 * | 9/2005 | Wohler | ............ | B25J 9/1674 382/103 |
| 2006/0292308 A1 * | 12/2006 | Clifford | ............ | B05B 12/149 427/427.2 |
| 2007/0096674 A1 * | 5/2007 | Hashimoto | ............ | B25J 9/1674 318/568.13 |
| 2007/0199047 A1 * | 8/2007 | Gibart | ............ | G06F 21/32 726/2 |
| 2008/0150467 A1 * | 6/2008 | Hashimoto | ............ | B25J 9/1676 318/568.17 |
| 2008/0273758 A1 * | 11/2008 | Fuchs | ............ | G01C 11/06 382/106 |
| 2008/0316310 A1 * | 12/2008 | Braune | ............ | F16P 3/14 348/143 |
| 2009/0072631 A1 * | 3/2009 | Iida | ............ | B25J 19/06 307/326 |
| 2009/0295580 A1 * | 12/2009 | Inoue | ............ | B25J 9/0093 340/555 |
| 2010/0007513 A1 * | 1/2010 | Horky | ............ | G08C 17/02 340/12.22 |
| 2010/0179690 A1 * | 7/2010 | Matthias | ............ | B25J 9/1676 700/253 |
| 2011/0301753 A1 * | 12/2011 | Bonin | ............ | B25J 9/1674 700/245 |
| 2012/0123563 A1 * | 5/2012 | Drinkard | ............ | F16P 3/144 700/13 |
| 2012/0163953 A1 * | 6/2012 | Murano | ............ | B25J 9/0093 414/788.1 |
| 2012/0182155 A1 * | 7/2012 | Sato | ............ | B25J 9/1674 340/686.6 |
| 2012/0218564 A1 * | 8/2012 | Wustefeld | ............ | G01S 7/497 356/614 |
| 2013/0154825 A1 * | 6/2013 | Anderson | ............ | F16P 3/144 340/539.11 |
| 2013/0197694 A1 * | 8/2013 | Harada | ............ | G01J 1/02 700/254 |
| 2013/0271274 A1 * | 10/2013 | Ebert | ............ | E02F 9/24 340/435 |
| 2014/0222206 A1 * | 8/2014 | Mead | ............ | B25J 9/1697 700/259 |
| 2014/0244004 A1 * | 8/2014 | Scott | ............ | B25J 9/1676 700/56 |
| 2014/0244037 A1 * | 8/2014 | Scott | ............ | B25J 9/1694 700/253 |
| 2015/0032252 A1 * | 1/2015 | Galluzzo | ............ | B25J 5/007 700/218 |
| 2015/0049911 A1 * | 2/2015 | Doettling | ............ | F16P 3/142 382/103 |
| 2016/0104046 A1 * | 4/2016 | Doettling | ............ | F16M 11/105 382/103 |
| 2016/0271800 A1 * | 9/2016 | Stubbs | ............ | B25J 9/1666 |
| 2016/0274586 A1 * | 9/2016 | Stubbs | ............ | G06K 7/10366 |
| 2017/0038494 A1 * | 2/2017 | Gelineau | ............ | F16P 3/144 |

FOREIGN PATENT DOCUMENTS

| | | |
|---|---|---|
| JP | 2000187513 A | 7/2000 |
| JP | 4405468 B2 | 1/2010 |
| JP | 5582422 B2 | 9/2014 |
| JP | 2015205385 A | 11/2015 |

* cited by examiner

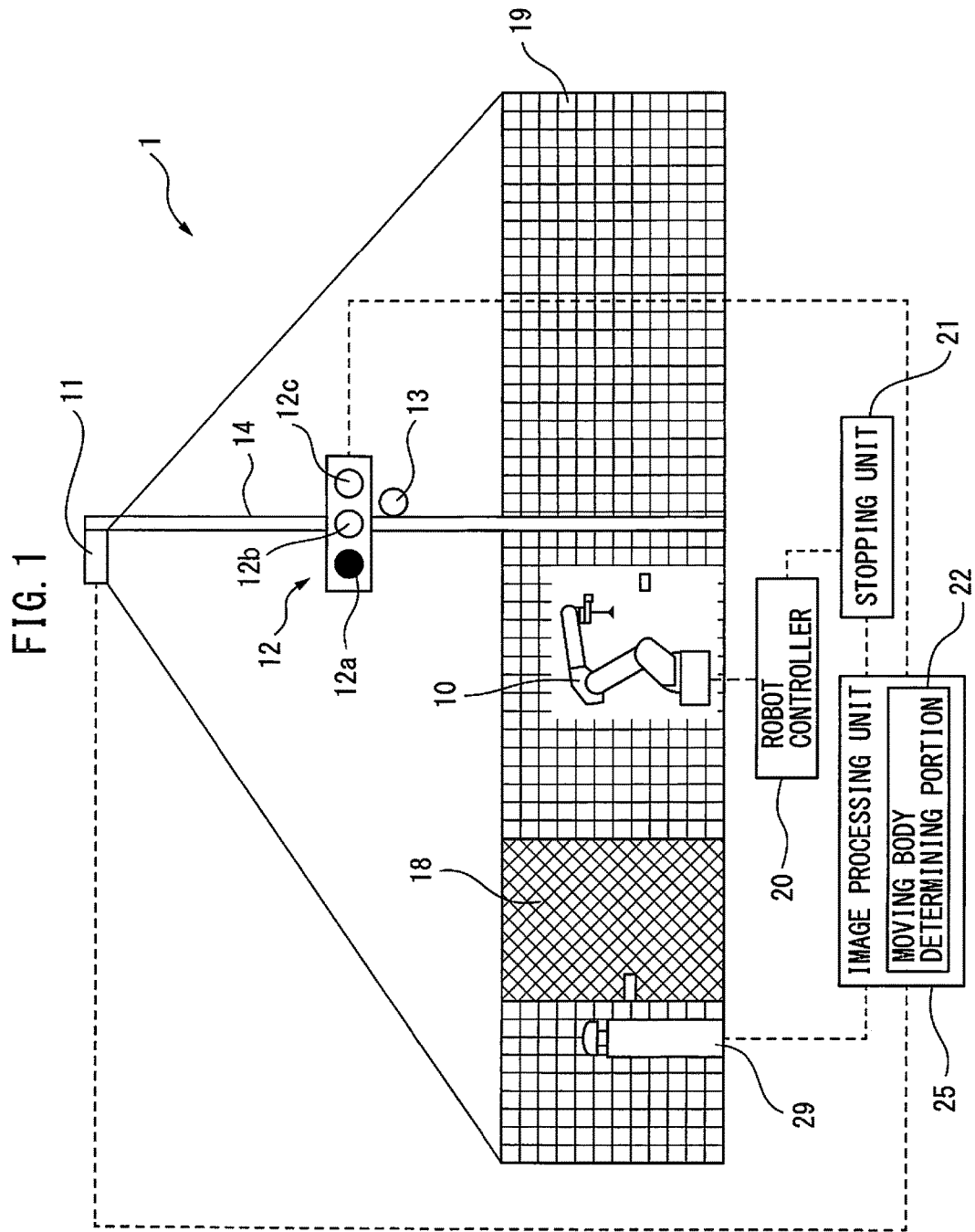

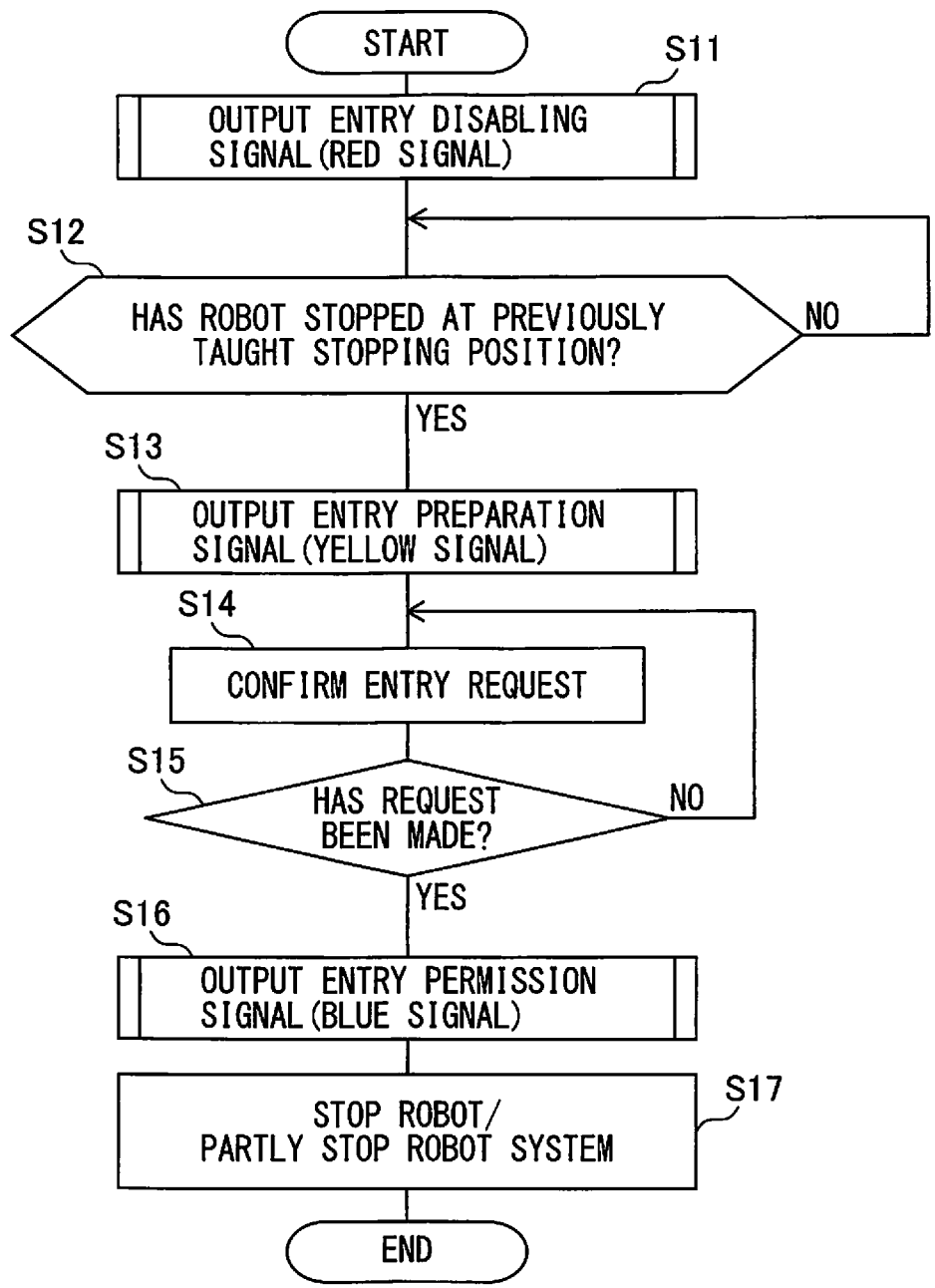

ROBOT SYSTEM USING A VISION SENSOR

RELATED APPLICATIONS

The present application claims priority to Japanese Application Number 2015-170971, filed Aug. 31, 2015, the disclosure of which is hereby incorporated by reference herein in its entirety.

BACKGROUND OF THE INVENTION

1. Field of the Invention

The present invention relates to a robot system that improves human safety with a vision sensor.

2. Description of the Related Art

Japanese Patent No. 5582422 discloses a robot system in which a robot moves in an operating area to which human access is restricted. Generally, if the robot is stopped at that point of time, it is inconvenient. If the presence of a person in the operating area is detected when the robot is performing a step of work, it takes the robot another step before it stops.

Further, Japanese Unexamined Patent Publication (Kokai) No. 5-77179 discloses a robot system in which if a maintenance request signal is inputted when a robot is in motion, the robot continues its operation up to the end of a block when the maintenance request signal was inputted, and then suspends work, and thereafter, the robot moves to a predetermined position where it is suitable for workers to perform maintenance work.

Further, Japanese Patent No. 4405468 discloses that images recorded by a first image recording unit and a second image recording unit are analyzed through at least two different methods, and then, the robot is stopped when a foreign object is detected by any of the methods.

SUMMARY OF THE INVENTION

However, in Japanese Patent No. 5582422, it is necessary to define such an inconvenient stage in advance and to take it into consideration when programming. If the technique disclosed in Japanese Patent No. 5582422 is applied to an existing robot system, it is necessary to change software programs of the robot system and circuits of a controller thereof. These changes involve relatively high cost and considerable trouble. Further, changing software programs and circuits requires a high degree of skill and care by workers and only a limited number of workers can do such work. It is difficult to freely make such changes where the robot system is situated. Further, if there is an error in these changes, the changed robot system can pose a danger to people. Generally, program changes, etc., of the existing robot systems are not actively made.

In the system of Japanese Unexamined Patent Publication (Kokai) No. 5-77179, it is necessary to previously establish information on the predetermined posture which is suitable for workers to perform maintenance work and information to move the robot to the predetermined posture. Further, in the system of Japanese Unexamined Patent Publication (Kokai) No. 5-77179, after the maintenance request signal is inputted, the robot is temporarily stopped at a block end. Therefore, when the robot moves from the stopping position (at the block end) to the predetermined position for the maintenance work, there is a possibility that the robot will contact an obstacle. There is the same problem when the robot returns to the stopping position after the maintenance work.

Further, in Japanese Patent No. 4405468, the stopping position of the robot is a position when a foreign object is detected, and therefore, it is difficult to establish such a stopping position of the robot. Further, depending on the stopping position of the robot, it may be difficult to restart the operation of the robot.

The present invention was made in light of the circumstances described above and has an object to provide a robot system which is applicable to an existing system without changing the programs, etc., and which does not pose a danger to people.

To achieve the above object, according to a first aspect of the present invention, there is provided a robot system including a robot which is provided in a robot operating section and a robot controller which controls the operation of the robot in the robot operating section. The robot system is comprised of an imaging unit for imaging a predetermined section which includes at least a portion of the robot operating section, an image processing unit which processes images taken by the imaging unit, an entry request unit which is to be operated when a person requests to enter the predetermined section, and a signal output unit which outputs, depending on a processing result of the image processing unit, an entry preparation signal indicating an entry preparation state for receiving the operation of the entry request unit, and an entry permission signal indicating that, in a case where the entry request unit has requested the person to enter the predetermined section, the person is permitted to enter the predetermined section. If the image processing unit detects that the operation of the robot has been stopped, the signal output unit outputs the entry preparation signal, and thereafter, if the person requests to enter the predetermined section using the entry request unit, an instruction to stop the operation of the robot, or an instruction to stop the operation of the robot as well as an instruction to stop a portion of the robot system which is necessary to enable the person to enter therein, are outputted, and the signal output unit outputs the entry permission signal.

According to a second aspect of the present invention, in the robot system according to the first aspect, when the robot is operating, the signal output unit outputs, depending on a processing result of the image processing unit, at least either one of an entry disabling signal indicating that the person is not permitted to enter the predetermined section and the entry permission signal.

According to a third aspect of the present invention, in the robot system according to the first aspect or the second aspect, only if the image processing unit detects that the robot has stopped its operation at a previously taught stopping position, the signal output unit outputs the entry preparation signal, and thereafter, if the person requests to enter the predetermined section using the entry request unit, an instruction to stop the operation of the robot, or an instruction to stop the operation of the robot as well as an instruction to stop a portion of the robot system which is necessary to enable the person to enter therein, are outputted.

According to a fourth aspect of the present invention, in the robot system according to any of the first to third aspects, if the image processing unit detects that the person has exited the predetermined section, the portion of the robot system or the robot is configured to be restarted.

According to a fifth aspect of the present invention, in the robot system according to any of the first to fourth aspects, if the image processing unit detects, after the signal output unit outputs the entry permission signal, that the operation of the robot has been started, an instruction to stop the operation of the robot, or an instruction to stop the operation of the robot as well as an instruction to stop a portion of the robot system which is necessary to enable the person to enter therein, are outputted.

According to a sixth aspect of the present invention, in the robot system according to any of the first to fifth aspects, the image processing unit includes a moving body determining portion which determines that a moving body which includes a worn article image model of an article worn by the person is the person and which determines that a moving body which does not include the worn article image model is a foreign object, and if the moving body, which has been determined as being the foreign object by the moving body determining portion, is detected in the predetermined section, an instruction to stop the operation of the robot, or an instruction to stop the operation of the robot as well as an instruction to stop a portion of the robot system which is necessary to enable the person to enter therein, are outputted.

According to a seventh aspect of the present invention, in the robot system according to any of the first to sixth aspects, if the image processing unit loses sight of the person before it detects that the person has exited the predetermined section, an instruction to stop the operation of the robot, or an instruction to stop the operation of the robot as well as an instruction to stop a portion of the robot system which is necessary to enable the person to enter therein, are outputted According to an eighth aspect of the present invention, in the robot system according to any of the first to seventh aspects, if the moving body determining portion determines that a moving body in the predetermined section is the person before the signal output unit outputs the entry permission signal, an instruction to stop the operation of the robot, or an instruction to stop the operation of the robot as well as an instruction to stop a portion of the robot system which is necessary to enable the person to enter therein, are outputted.

According to a ninth aspect of the present invention, in the robot system according to the second aspect, the signal output unit includes at least one of a first output portion which outputs the entry permission signal and a second output portion which outputs the entry disabling signal, and a third output portion which outputs the entry preparation signal. In the case where the signal output unit includes only the first output portion and the third output portion, the fact that the first output portion does not output the entry permission signal, means that the person is not permitted to enter the predetermined section, and the first output portion and the third output portion are disposed such that they are recognizable to the person. In the case where the signal output unit includes only the second output portion and the third output portion, the fact that the second output portion does not output the entry disabling signal, means that the person is permitted to enter the predetermined section, and the second output portion and the third output portion are disposed such that they are recognizable to the person. In the case where the signal output unit includes the first output portion, the second output portion, and the third output portion, the first output portion, the second output portion, and the third output portion are disposed such that they are recognizable to the person.

According to a tenth aspect of the present invention, in the robot system according to any of the third to ninth aspects, the stopping position is taught as a space of predetermined size. When the image processing unit detects that the robot has stopped its operation in the space, it is considered that the robot has stopped at the stopping position.

According to an eleventh aspect of the present invention, in the robot system according to the ninth aspects, the entry permission signal, the entry disabling signal, or the entry preparation signal is outputted either visually or audibly, or both such that they are different from one another.

According to a twelfth aspect of the present invention, there is provided a robot system including a robot which is provided in a robot operating section and a robot controller which controls the operation of the robot in the robot operating section. The robot system is comprised of an imaging unit for imaging a predetermined section which includes at least a portion of the robot operating section, an image processing unit which processes images taken by the imaging unit, an entry request unit which is to be operated when a person requests to enter the predetermined section, and a signal output unit which outputs, depending on a processing result of the image processing unit, an entry preparation signal indicating an entry preparation state for receiving the operation of the entry request unit, and an entry permission signal indicating that, in a case where the entry request unit has requested the person to enter the predetermined section, the person is permitted to enter the predetermined section. If the image processing unit detects that the operation of the robot has been stopped at a previously taught stopping position, only when the person previously requests to enter the predetermined section using the entry request unit, the entry preparation signal is outputted from the time the entry is requested, and at the time of detecting the stopping of the operation of the robot at the previously taught stopping position, an instruction to stop the operation of the robot, or an instruction to stop the operation of the robot as well as an instruction to stop a portion of the robot system which is necessary to enable the person to enter therein, are outputted, and the signal output unit outputs the entry permission signal.

These objects, features, and advantages of the present invention and other objects, features, and advantages will become further clearer from the detailed description of typical embodiments illustrated in the appended drawings.

BRIEF DESCRIPTION OF THE DRAWINGS

FIG. 1 is a schematic view of a robot system in accordance with the present invention.

FIG. 2 is a flow chart illustrating the basic operation of the robot system in accordance with the present invention.

DETAILED DESCRIPTION

Figure 3A:
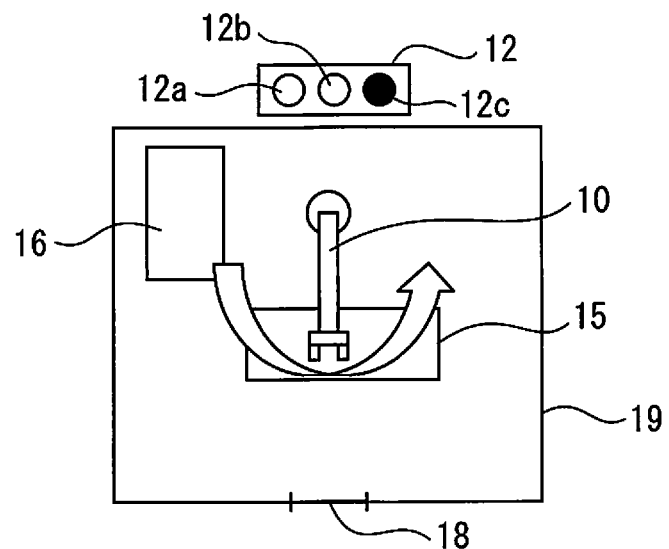
FIG. 3A is a first view illustrating an image taken by a vision sensor together with a signal output unit.

With reference to the appended drawings, a description will now be made of embodiments of the present invention. In the following figures, similar members are given similar reference numerals. These figures are properly modified in scale to assist the understanding thereof.

FIG. 1 illustrates an outline of the robot system based on the present invention. As shown in FIG. 1, a robot system 1 of the present invention includes a robot 10 and a robot controller 20 which controls the robot 10. Further, FIG. 1 also illustrates a vision sensor 11 which has the robot 10 and the perimeter thereof in sight and an image processing unit 25 which processes images captured by the vision sensor 11 to output various signals.

The robot 10 is an industrial robot 10, for example, an articulated robot 10. The vision sensor 11 is mounted at the top of a post 14 disposed in the vicinity of the robot 10 and is used to capture images of the robot 10, etc. from above. The vision sensor 11 includes a camera which incorporates a Time-of-Flight (TOF) area sensor device, and also includes an LED lighting device. The vision sensor 11 measures a returning time of reflected light of LED light to capture a two-dimensional depth image.

Further, with reference to FIG. 1, a safety fence 19 with a door 18 is disposed around the robot 10. The safety fence 19 restricts human access to a robot operating section where the robot 10 works. The field of view of the vision sensor 11 includes a predetermined section including at least a portion of the robot operating section. Note that the predetermined section may be defined by different means other than the safety fence 19, i.e., by using, for example, a white marking line provided on the floor. Further, the vision sensor 11 captures images of the predetermined section from above.

Images taken at each designated time by the vision sensor 11 are processed by the image processing unit 25 of the robot controller 20. With this provision, a person or foreign object which enters the predetermined section is detected as described below. By carrying out this process at predetermined time intervals, it is also possible to follow or track a person or something in the predetermined section.

Image models of a person, a person's worn article, the robot 10 and robot operating area are previously taught to the image processing unit 25. The image processing unit 25 performs matching of these image models and images taken by the vision sensors 11 such that a person and the robot 10 are specified and detected. The image models are formed by extracting characterizing portions of a person and the robot 10 from preprocessed reference images (described below). Further, when the position of the robot 10, which is specified by performing matching of images that are continuously and periodically captured a predetermined number of times by the vision sensor 11, and image models of the robot 10, is not changed, the stopping of operation of the robot 10 can be detected.

The image processing unit 25 determines, by using images taken by the vision sensor 11, whether or not it is permissible for a person to safely enter the predetermined section in the safety fence 19, and then, causes a signal output unit 12 to output a determining result. The signal output unit 12 is mounted to the post 14 below the vision sensor 11. Note that the signal output unit 12 may be placed in other locations.

Further, as shown in FIG. 1, an entry request unit 29, for example, a push-button is disposed in the vicinity of the door 18 of the safety fence 19. By operating the entry request unit 29, a person may convey to the image processing unit 25 his intention to enter the predetermined section.

As can be seen from FIG. 1, the signal output unit 12 includes a plurality, for example, three output portions 12a, 12b, and 12c. In accordance with the results of the processing from the image processing unit 25, the signal output unit 12 outputs a corresponding signal through either one of the first output portion 12a to the third output portion 12c. The first output portion 12a to the third output portion 12c are disposed such that they are recognizable to people or such that they attract people's attention.

If a person requests to enter the predetermined section via the entry request unit 29, the first output portion 12a of the signal output unit 12 outputs an entry permission signal which indicates that the person is permitted to enter the predetermined section. Further, the second output portion 12c outputs an entry disabling signal which indicates that the person is not permitted to enter the predetermined section due to the fact that the robot is in motion.

Further, the third output portion 12b outputs an entry preparation signal which indicates a state in which the entry request unit 29 is operable by a person. Note that the "state in which the entry request unit 29 is operable by a person" means that a person can actually operate the entry request unit 29 to output an entry permission signal.

In other words, when the entry preparation signal is outputted, the robot 10 has stopped its operation, thereby indicating that it is ready to permit the person to enter the predetermined section. Accordingly, if a person operates the entry request unit 29 when the entry preparation signal is outputted, the operation of the robot is stopped, and the entry preparation signal is switched to the entry permission signal. Note that if a person operates the entry request unit 29 when the entry disabling signal is outputted, this operation is not accepted because the entry preparation signal is not outputted, and therefore, the entry permission signal is not outputted and the entry disabling signal is continuously outputted.

Further, preferably, the output portions 12a to 12c are light emitters, for example, light emitters which emit lights that are different in color from one another. It is preferable, for example, that the first output portion 12a which outputs the entry permission signal is a light emitter which emits blue light, the third output portion 12b which outputs the entry preparation signal is a light emitter which emits yellow light, and the second output portion 12c which outputs the entry disabling signal is a light emitter which emits red light. It is understood that the signal output unit 12 is so mechanically similar to those of traffic light signals, and therefore, a person may easily determine whether it is currently safe to enter the predetermined section.

As shown in FIG. 1, an audio output unit 13, for example, a speaker is disposed in the vicinity of the signal output unit 12. In place of or in cooperation with the signal output unit 12, the audio output unit 13 may be structured such that it outputs mutually different sounds or tones which respectively correspond to the entry disabling signal, the entry preparation signal and the entry permission signal.

Further, as seen in FIG. 1, the robot controller 20 is connected to a stopping unit 21. The stopping unit 21 outputs, depending on a processing result of the image processing unit 25 and an entry request operation performed by the entry request unit 29, an instruction to stop the robot 10, or an instruction to stop the robot 10 as well as an instruction to stop a portion of the robot system 1 which is necessary to enable the person to enter therein.

The instruction to stop the robot 10 is, for example, an instruction to interrupt the execution of a program. Alternatively, the instruction to stop the robot 10 may be an instruction for cutting off the power of the robot 10. With this provision, it is possible to certainly stop the robot 10. Further, the stopping unit 21 can stop the aforesaid portion of the robot system 1 and/or the robot 10.

Further, the image processing unit 25 includes a moving body determining portion 22. It determines that a moving body which includes a worn article image model of a person's worn article is a person and also determines that a moving body which does not include the worn article image model is a foreign object. The aforesaid person's worn article is, for example, a helmet, cap, badge, etc. which is required to be worn by a person. With this provision, it is easy to determine whether it is a foreign object or not.

Figure 3B:
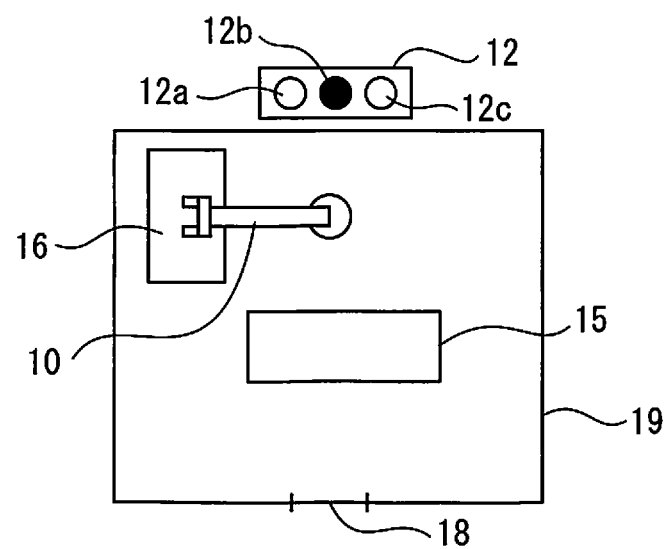
FIG. 3B is a second view illustrating an image taken by the vision sensor together with the signal output unit.

FIG. 2 is a flow chart which illustrates the basic operation of the robot system 1 according to the present invention. Further, FIGS. 3A and 3B are views illustrating images captured by the vision sensor and also illustrate operating states of the signal output unit corresponding to the respective images.

Figure 3C:
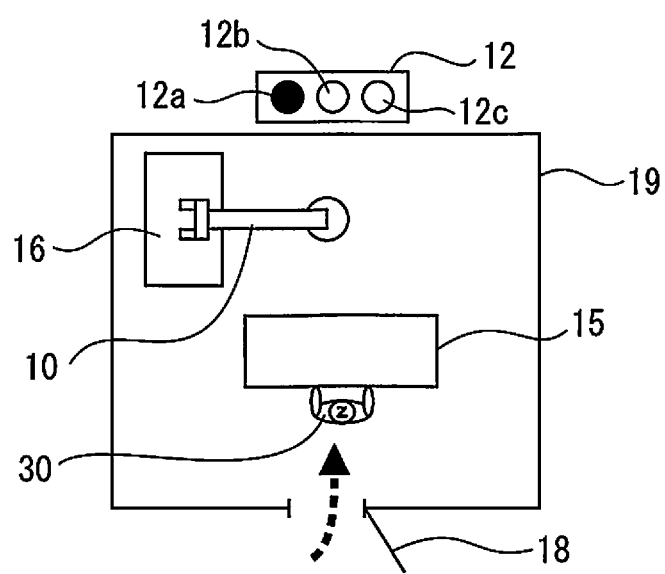
FIG. 3C is a third view illustrating an image taken by the vision sensor together with the signal output unit.

As described above, the vision sensor 11 is mounted at the top of the post 14. Therefore, the images taken by the vision sensor 11 correspond to a plan view of the predetermined section inside the safety fence 19, as shown in FIGS. 3A to 3C. The images illustrated in FIGS. 3A to 3C include the robot 10 which is present in the predetermined section and first peripheral equipment 15 and second peripheral equipment 16 which are disposed around the robot 10. As can be seen from FIGS. 3A to 3C, the second peripheral equipment 16 is positioned farther from the door 18 than the first peripheral equipment 15.

Further, the reference image described above is previously registered in the image processing unit 25. The reference image is, for example, an image which is captured by the vision sensor 11 at the stopping position taught to the image processing unit 25. For example, in the image shown in FIG. 3B, the robot 10 stops in a position above the second peripheral equipment 16, and an image model to detect that the robot 10 stops in this position is produced from this reference image. In this instance, the reference image is previously taught to the image processing unit 25 such that the stopping of the operation of the robot 10 in the position above the second peripheral equipment 16 can be detected. According to the present invention, an image previously captured is used as a reference image in this way.

Note that a plurality of stopping positions may be taught, and in this instance, a plurality of reference images is registered for the corresponding stopping positions. Even in such instance, only moving the robot 10 to each stopping position and imaging it by the vision sensor 11 enable the stopping positions of the robot in the robot system 1 to be easily taught. Further, the stopping positions of the robot 10 are displayed, based on the reference images, on a display of an operation panel (not shown) connected to the image processing unit 25, and therefore, it is possible for an operator to intuitively acquire information on the stopping positions, etc. of the robot 10.

With reference to FIG. 2 etc., a description will now be made of the basic operation of the robot system 1 according to the present invention. The contents illustrated in FIG. 2 etc. are those which are carried out when the robot 10 operates according to a predetermined operation program. The operation program is made so that the stopping positions taught by the image processing unit 25 are set to be on the path of operation of the robot 10, and the robot temporarily stops its operation at each stopping position.

At the beginning, at step S11 of FIG. 2, the process determines that, when the robot 10 is in motion, it is dangerous for a person to enter the predetermined section inside the safety fence 19. Accordingly, the second output portion 12c of the signal output unit 12 outputs the entry disabling signal, for example, a red signal (refer to FIG. 3A).

At step S12, images are continuously and periodically taken by the vision sensor 11. The taken images and the reference images of the stopping positions are compared. Image models of the robot 10 at the stopping positions are produced from the reference images of the stopping positions in this case. Further, the image processing unit 25 performs model matching of the image models of the robot 10, and then, based on the matching result, the process determines that the robot 10 has reached the stopping position. As such, images are continuously and periodically taken a predetermined number of times, and then, based on the matching result, the robot 10 is detected at the stopping position, and thus, the process determines that the operation of the robot 10 is stopped, then it proceeds to step S13.

At this point, since the robot 10 is currently in the stopping position for maintenance, it can be determined that it is ready to permit the person to enter the predetermined section. Thus, at step S13, the entry disabling signal, for example, a red signal by the second output portion 12c is switched to the entry preparation signal, for example, a yellow signal by the third output portion 12b (refer to FIG. 3B).

Then, at step S14, the process confirms whether the request to enter has been made via the entry request unit 29, and at step S15, if it determines that the request has been made, then it proceeds to step S16.

If the process determines that the operation of the robot 10 is stopped at the stopping position taught by the image processing unit 25, the entry request made by the entry request unit 29 is confirmed (step S17), and thus, it proceeds to step S16 because it is no longer dangerous for a person to enter the predetermined section inside the safety fence 19, since the robot 10 is stopped at the stopping position At step S16, the entry preparation signal, for example, a yellow signal by the third output portion 12b is switched to the entry permission signal, for example, a blue signal by the first output portion 12a (refer to FIG. 3C). Thus, in the present invention, if the request to enter is made when the entry preparation signal, for example, a yellow signal is outputted, the entry permission signal, for example, a blue signal is outputted accordingly. Therefore, a person may easily find the right timing to request to enter.

Then, at step S17, the stopping unit 21 outputs an instruction to stop the robot 10. Thus, the robot 10 remains stationary at the stopping position. Further, the stopping unit 21 also outputs an instruction to stop a portion of the robot system 1 which is necessary to enable the person to enter therein. Additionally, the door 18 may be unlocked. As shown in FIG. 3C, in this condition, even if a person 30 enters the predetermined section, there is no danger to the person because the robot, etc. is not in motion. The foregoing description describes the basic operation of the robot system 1 of the present invention.

Further, although not illustrated in FIG. 2, as in claim 12, in order to output, if the image processing unit 25 detects the stopping of the operation of the robot 10 at the previously taught stopping position, only when the person previously requests to enter the predetermined section using the entry request unit 29, the entry preparation signal from the point of time when the entry is requested, and in order to output an instruction to stop the operation of the robot 10 at the time of detecting the stopping of the operation of the robot 19 at the previously taught stopping position, and to output, if necessary, an instruction to stop a part of the robot system 1 which is necessary to enable the person to enter therein, a step to confirm the entry requests at steps S15 and S16 and step S13 for outputting the entry preparation signal are set before step S12 for detecting the stopping of the operation of the robot at the previously taught stopping position.

Note that a person may request to enter by using hand signals instead of operating the entry request unit 29. In this instance, image models corresponding to the hand signals are previously registered in the image processing unit 25 and the image processing unit 25 determines by performing model matching whether the request to enter has been made or not. Consequently, it is possible to completely eliminate the entry request unit 29.

Then, a description will be made of the operations of the robot system 1 with respect to each kind of signal which the signal output unit 12 outputs. First, with reference to FIGS. 3A to 3C and FIG. 4, a description will be made of the operations of the robot system when the entry disabling signal, for example, a red signal or the entry preparation signal, for example, a yellow signal is outputted. The contents shown in FIG. 4 are repeated at predetermined control intervals.

Figure 4:
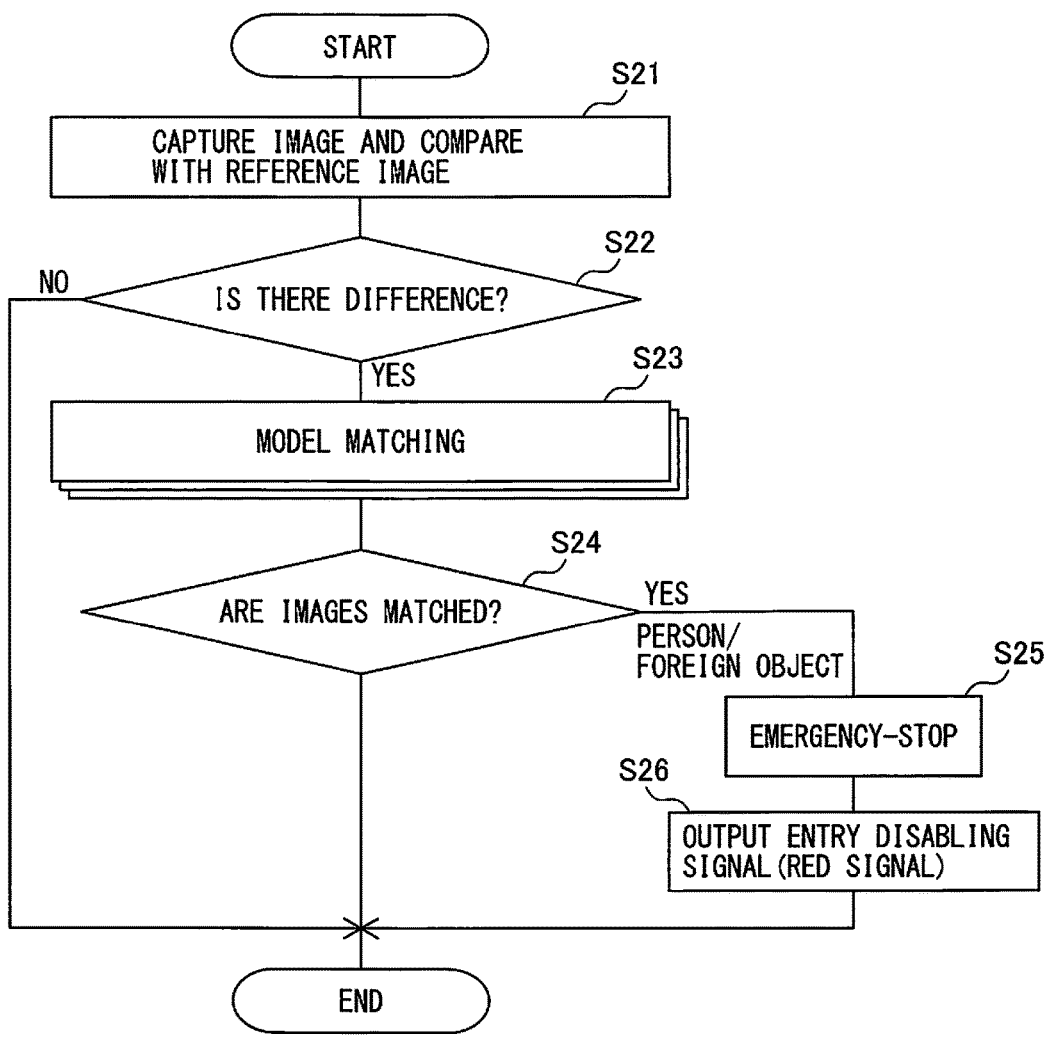
FIG. 4 is a first flow chart illustrating the operation of the robot system.

In FIG. 4, an image is taken in the predetermined section by the vision sensor 11 when the entry disabling signal, for example, a red signal is outputted, and then, this image is defined as a reference image for condition monitoring. When the reference image is taken, the entry disabling signal, for example, a red signal is outputted, and there, there should be, at least in the beginning, no moving body such as a person or a foreign object in the predetermined section.

At step S21 of FIG. 4, the vision sensor 11 captures images of the predetermined section within the safety fence 19 and then comparison between the thus captured image and the reference image for condition monitoring is carried out. At step S22, if there is a difference between these images, then the process proceeds to step S23. Then, at step S23, the moving body determining portion 22 of the image processing unit 25 determines, by using the model matching technique, whether or not the robot 10, the person 30, or a foreign object exists in the images.

At step S24, as image models, which are made by extracting the characteristics of the robot 10 from the reference images obtained by previously imaging the robot 10, are prepared, if the robot 10 is firstly determined as being matched through the model matching process, then model matching is carried out with respect to the person 30 or the foreign object, excluding that portion of the robot 10. The aforesaid worn article image model, for example, a helmet image model are previously captured as a reference image, and an image model made by extracting the characteristics of the helmet is prepared, and accordingly, when being matched with the helmet image model, the moving body determining portion 22 determines that the difference is the person 30. If another difference exists which does not match with the previously registered image models, then the moving body determining portion 22 determines that this difference is a foreign object. Further, if there is no such difference, the moving body determining portion 22 determines that there is neither a person nor a foreign object in the predetermined section, and then the process ends accordingly.

If the entry disabling signal, for example, a red signal is outputted, the robot 10 is moving or in motion, and therefore, a person should not be in the predetermined section. Further, if the entry preparation signal, for example, a yellow signal is outputted, it is not permissible for a person to enter therein, and therefore, there should be no person in the predetermined section.

If a person is detected in the predetermined section when the entry disabling signal or the entry preparation signal is outputted, it means that the person is in the predetermined section without permission. In fact, at step S24, if a person is detected, the process proceeds to step S25, where the robot 10 is emergency-stopped by the stopping unit 21. It is preferable that the stopping unit 21 stops the robot 10 by cutting off the power. To this end, a necessary portion of the robot system 1 may be stopped as described above.

Note that when a foreign object is detected at step S24, a similar process is carried out. When the third output portion 12b outputs the entry preparation signal, for example, a yellow signal, at step S26, it is switched to the entry disabling signal, for example, a red signal by the second output portion 12c. Note that, when the entry disabling signal is initially outputted, the entry disabling signal is maintained at step S26.

As such, according to the present invention, through the comparison between the current image and the reference image, it is easy to identify a foreign object and a person. Note that it is preferable that a plurality of model matchings is performed through a plurality of image models, thereby improving the accuracy in identifying the person 30 and foreign objects.

Figure 5:
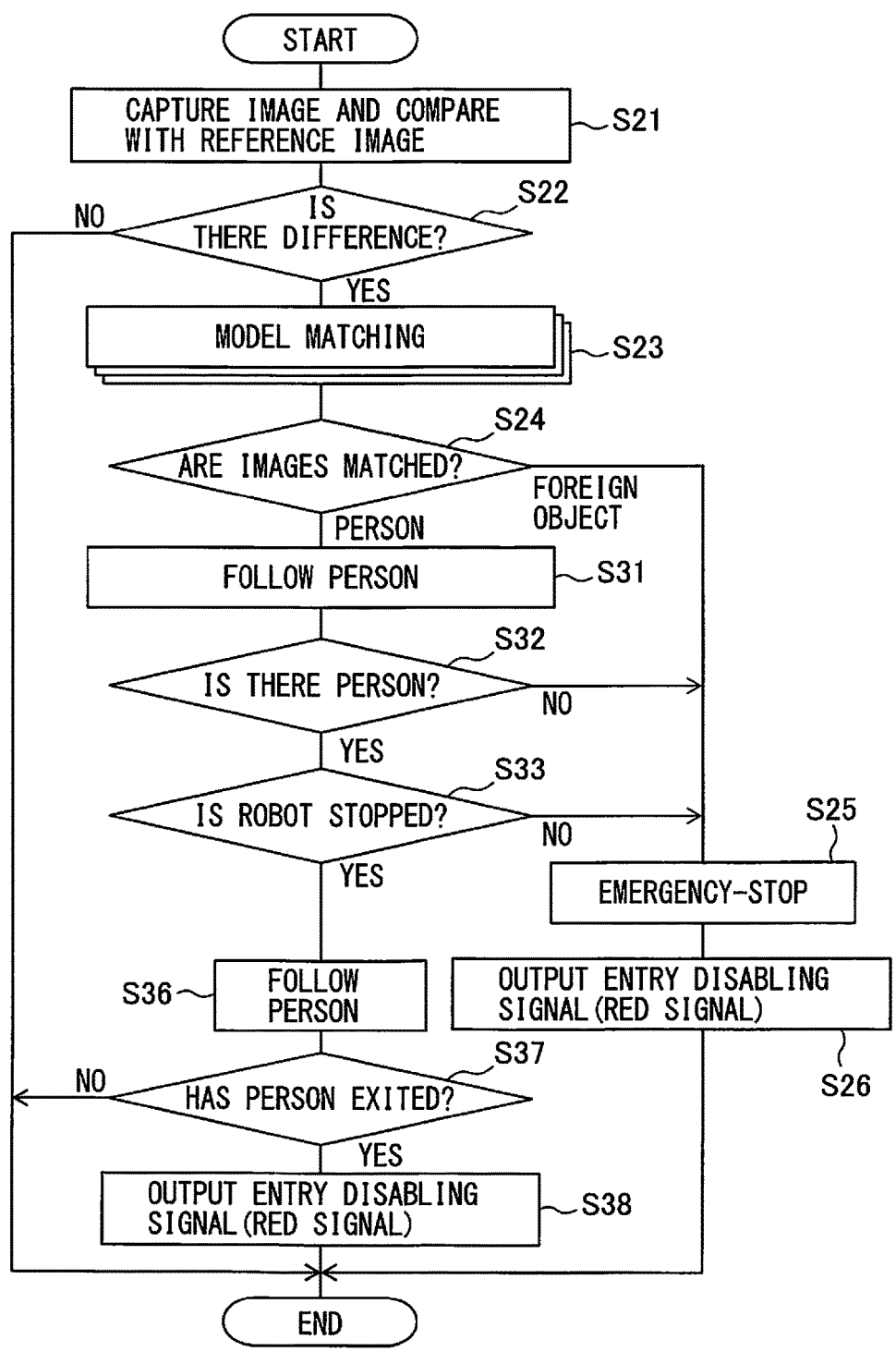
FIG. 5 is a second flow chart illustrating the operation of the robot system.

Then, with reference to FIGS. 3A to 3C and FIG. 5, a description will be made of the operation of the robot system when the entry permission signal, for example, a blue signal is outputted. The contents shown in FIG. 5 are repeated at predetermined control intervals. Further, step S21 to step S23 of FIG. 5 are similar to those described above, and a duplicate description thereof has been omitted. Note that images of the predetermined section are captured by the vision sensor 11 when the entry permission signal, for example, a blue signal has been outputted, and these images are defined as the reference images for condition monitoring in step S21.

At step S22, the robot 10 is stopped and therefore any difference indicating the robot does not exist. Further, when it is determined as being matched with the aforesaid worn article image model, for example, a helmet image model, then the moving body determining portion 22 determines that the difference is a person 30. On the contrary, if another difference exists which does not match with the previously registered image models, then the moving body determining portion 22 determines that this difference is a foreign object. Note that, if there is no such difference, the moving body determining portion 22 determines that there is neither a person nor a foreign object in the predetermined section.

If a foreign object is detected, there is a possibility that the robot 10 and peripheral equipment 15, 16 will be damaged by the foreign object. Thereafter, when the robot system is restarted, there is a possibility that the foreign object still remains at the time of restarting the robot system 1. In particular, if the foreign object is another person which does not match with the wearing article image model, there is a possibility that the robot poses a danger to that person when he carelessly approaches the robot and the robot starts moving. In this instance, the process proceeds to step S25, where the stopping unit 21 emergency-stops the robot 10 as described above. Further, as described above, the portion of the robot system 1 may be stopped. With this configuration, the above described danger can be avoided. Then, at step S26, the entry permission signal, for example, a blue signal by the first output portion 12a is switched to the entry disabling signal, for example, a red signal by the second output portion 12c.

At step S24, if a person is detected (refer to FIG. 3C), the person is followed at step S31. Then, the image processing unit 25 detects the position of the person 30 through images taken at each designated time. Then, at step S32, it is determined whether the person 30 is in the predetermined section or not. This determination is carried out by checking the model matching of the person 30. If it is not possible to check the model matching or if it is determined that the image processing unit loses sight of the person 30 in the predetermined section, the process proceeds to step S25, where, as described above, a portion of the robot system 1 and/or the robot 10 is emergency-stopped. With this configuration, it is possible to ensure the safety of the person.

Further, at step S32, if the process determines that the person is in the predetermined section, then it proceeds to step S33. At step S33, the process determines through monitoring the matching position of the model matching in step S22 whether the robot 10 is stopped or not. At this point, the entry permission signal, for example, a blue signal is outputted, and therefore, the robot 10 should be stopped at the previously taught position.

At step S33, if the process determines that the robot 10 is moving, it can be judged that the robot 10 is unintentionally moving for some reason. In this instance, a person in the predetermined section is in danger, and therefore, the process proceeds to step S25, where, as described above, the necessary portion of the robot system 1 and/or the robot 10 is emergency-stopped. It is understood that, according to the above process, even if a person 30 works inside the fence 19, it is possible to ensure the safety of the person 30.

Note that, although not illustrated in the figures, it is preferable that if the process determines that the robot is moving although there is no person in the predetermined section, then the necessary portion of the robot system 1 and/or the robot 10 is emergency-stopped as described above. It is thereby possible to avoid a collision between the robot 10 and the associated peripheral equipment.

In this regard, depending on the type of work a person has to carry out with respect to the robot 10, there is an area where it is permissible for the person to enter after the emergency-stop of the robot 10. In the present invention, if it is detected that the robot is moving when the entry permission signal is outputted, the robot, etc. are emergency-stopped. This means that, in the present invention, it is permissible for a person to enter the aforesaid area without the need of the previous emergency-stop of the robot 10, etc., from the beginning. Accordingly, even if there is portion to which workers cannot sufficiently perform maintenance work in an emergency-stop condition, the present invention enables such maintenance work for that portion. Further, when the robot 10 is reactivated, it is also possible to exclude the influence caused by the emergency-stop.

Then, at step S36, the process continuously follows the person without losing track thereof, and if it is confirmed that the person 30 has exited the predetermined area, then the process proceeds to step S37. An exit operation unit may be added to the entry request unit 29. With this configuration, by operating the exit operation unit when exiting the predetermined section, the person can indicate that he has exited the predetermined section in the safety fence 19. At step S37, in this way, the process may determine whether the person 30 exits the predetermined section or not. At step S36, to follow the person, image model matching is repeated to determine the existence of the person 30 in the current images as described above.

If it is confirmed that the person 30 has exited the predetermined section, the entry permission signal, for example, a blue signal by the first output portion 12a is switched to the entry disabling signal, for example, a red signal by the third output portion 12b. At the same time, the robot 10 is reactivated by releasing the stopping unit 21 such that the robot system 1 is restarted. Accordingly, the robot 10 can easily continue to work in accordance with the operation program. Further, since the robot 10, etc., is reactivated after the person has exited the predetermined section, the safety of the person is ensured.

Thus, in the present invention, when the robot 10 stops its operation at the previously taught stopping position, the robot 10 stops working at the stopping position, and at the same time, the robot system 1 is partly stopped in accordance with the need, and the entry permission signal is outputted. The robot 10 and/or the robot system 1 are stopped when the entry permission signal is outputted, and accordingly, the person can safely enter the predetermined section in the vicinity of the robot 10. In other words, even if the person 30 makes a request to enter the predetermined section when the robot 10 is moving, it is not permissible for the person 30 to enter therein.

Note that each stopping position of the robot 10 may be taught as a space of predetermined size. If the image processing unit 25 detects that the robot has stopped its operation in the spaces, it is considered that the robot 10 has stopped its operation at the stopping position. This configuration gives a margin to the stopping positions, etc. of the robot 10, thereby further ensuring the safety of the person.

Further, in the present invention, it is sufficient to simply install the vision sensor 11 and simply teach the stopping positions of the robot 10 to the image processing unit 25. The present invention can be applied to an existing system without remodeling the robot 10. Accordingly, the present invention, unlike the prior art, can do away with the need of changing the software programs and circuits of the robot. Further, in the present invention, the burden on the operator at the time of teaching can be eased and a high skill level is not required for the operator.

In an unillustrated embodiment, the signal output unit 12 may be provided with only at least one of the first output portion 12a and the second output portion 12c. For example, the signal output unit 12 may be provided with only the first output portion 12a and the second output portion 12c.

In this case, if the first output portion 12a does not output the entry permission signal, i.e., the first output portion 12a is switched off, means that it is not permissible for a person to enter the predetermined section.

Further alternatively, the signal output unit 12 may be provided with only the second output portion 12c and the third output portion 12b. In this case, if the second output portion 12c does not output the entry disabling signal, e.g., the first output portion 12a is switched off, means that it is permissible for a person to enter the predetermined section.

In either of the above two cases, it is also possible for a person to easily determine whether or not it is now safe to enter the predetermined section by simply watching the signal output unit 12. Further, it is possible to reduce the number of the output portions, and in this instance, it is possible to reduce the size and cost of the signal output unit 12.

Effect of the Invention

In the first aspect of the invention, when an image processing unit detects that the operation of a robot has been stopped, an entry preparation signal is outputted, and the operation of an entry request unit is enabled. When the entry request unit issues a request for entry, the operation of the robot is stopped, and a robot system is partly stopped if necessary, and then, an entry permission signal is outputted. In this respect, the partly stopping of the robot system is performed, if necessary, in the entry, and accordingly, only the operation of the robot is stopped in some cases. When the entry permission signal is outputted, the robot etc. has been stopped, and accordingly, a person can safely enter a predetermined section. In other words, when the robot is in motion, if a person requests to enter the predetermined section, the person cannot enter the predetermined section.

Further, the first aspect of the invention can be applied to existing robot systems, without remodeling the robot, by only installing an imaging unit, and teaching the image processing unit to detect the stopping of the operation of the robot. Thus, it is not necessary to change software programs and circuits.

In the second aspect of the invention, the person does not enter the predetermined section when an entry disabling signal is outputted, and enters the predetermined section when the entry permission signal is outputted.

In the third aspect of the invention, only if the image processing unit detects that the robot has stopped its operation at a previously taught stopping position, the entry preparation signal is outputted, and thereafter, if the person requests to enter the predetermined section, the operation of the robot is stopped, and a portion of the robot system is stopped if necessary, and accordingly, a place for, for example, maintenance can be specified after the operation of the robot is stopped.

In the fourth aspect of the invention, after the person exits the predetermined section, the robot etc. is restarted. Accordingly, the safety of the person can be ensured.

In the fifth aspect of the invention, if the robot starts moving when the robot should be stopped, it is possible to emergency-stop the robot, etc. Thus, it is possible to ensure the same level of safety as when emergency-stopped in advance. In other words, even if it is a section where entry is permitted after emergency-stopping the robot, etc., in the conventional technique, the present invention enables the person to enter such a section without emergency-stopping the robot etc. Therefore, even if there is a portion to which workers cannot sufficiently perform maintenance work in an emergency-stop condition, the present invention enables such maintenance work to be performed. Further, when the robot is restarted, it is possible to do away with the influence caused by the emergency-stop.

In the sixth aspect of the invention, it is determined that a moving body which does not include the worn article image model, for example, helmet, cap, budge, etc., is a foreign object, and therefore, it is possible to easily judge a foreign object. If a moving body, which includes the worn article image model, i.e., a person is detected in the predetermined section, the robot etc. is not emergency-stopped and the person can continue to work. A person who does not wear the article to be worn is one who is not permitted to work in the predetermined section, and is determined to be a foreign object in the predetermined section. Accordingly, the robot etc. is emergency-stopped and it is possible to ensure the safety of that person.

In the seventh aspect of the invention, if the image processing unit loses sight of a person in the predetermined section, the robot etc. is stopped accordingly, ensuring the safety of the person.

In the eighth aspect of the invention, if a person is detected in the predetermined section when it is not permissible for the person to enter the predetermined section, the robot, etc., is stopped, ensuring the safety of the person.

In the ninth aspect of the invention, by referring to a third output portion for outputting the entry preparation signal, and at least one of a first output portion for outputting the entry permission signal and a second output portion for outputting the entry disabling signal, it is possible for a person to easily determine whether or not it is now safe to enter the predetermined section. Further, it is possible to reduce the number of the output portions.

In the tenth aspect of the invention, since the stopping position of the robot is defined as a space of predetermined size, it is possible to give a margin to, for example, the stopping position of the robot.

In the eleventh aspect of the invention, it is possible to form the signal output unit of a relatively simple structure.

In the twelfth aspect of the invention, even if the time of stopping of the operation of the robot at a previously taught stopping position is short, the image processing unit can previously issue an entry request.

The present invention has been described above using exemplary embodiments. However, a person skilled in the art would understand that the aforementioned modifications and various other modifications, omissions, and additions can be made without departing from the scope of the present invention.

What is claimed is:

1. A robot system including a robot which is provided in a robot operating section and a robot controller which controls the operation of the robot in the robot operating section, comprising:
   an imaging unit for imaging a predetermined section which includes at least a portion of the robot operating section;
   an image processing unit which processes images taken by the imaging unit;
   an entry request unit which is to be operated when a person requests to enter the predetermined section; and
   a signal output unit which outputs, depending on a processing result of the image processing unit, an entry preparation signal indicating an entry preparation state for receiving the operation of the entry request unit, and an entry permission signal indicating that, in a case where the entry request unit has requested the person to enter the predetermined section, the person is permitted to enter the predetermined section;
   wherein if the image processing unit detects that the operation of the robot has been stopped, the signal output unit outputs the entry preparation signal, and thereafter, if the person requests to enter the predetermined section using the entry request unit, an instruction to stop the operation of the robot, or an instruction to stop the operation of the robot as well as an instruction to stop a portion of the robot system which is necessary to enable the person to enter therein, are outputted, and the signal output unit outputs the entry permission signal.

2. The robot system according to claim 1, wherein when the robot is operating, the signal output unit outputs, depending on a processing result of the image processing unit, at least either one of an entry disabling signal indicating that the person is not permitted to enter the predetermined section and the entry permission signal.

3. The robot system according to claim 1, wherein, only if the image processing unit detects that the robot has stopped its operation at a previously taught stopping position, the signal output unit outputs the entry preparation signal, and thereafter, if the person requests to enter the predetermined section using the entry request unit, an instruction to stop the operation of the robot, or an instruction to stop the operation of the robot as well as an instruction to stop a portion of the robot system which is necessary to enable the person to enter therein, are outputted.

4. The robot system according to claim 1, wherein if the image processing unit detects that the person has exited the predetermined section, the portion of the robot system or the robot is configured to be restarted.

5. The robot system according to claim 1, wherein if the image processing unit detects, after the signal output unit outputs the entry permission signal, that the operation of the robot has been started, an instruction to stop the operation of the robot, or an instruction to stop the operation of the robot as well as an instruction to stop a portion of the robot system which is necessary to enable the person to enter therein, are outputted.

6. The robot system according to claim 1, wherein the image processing unit includes a moving body determining portion which determines that a moving body which includes a worn article image model of an article worn by the person is the person and which determines that a moving body which does not include the worn article image model is a foreign object, and
wherein if the moving body, which has been determined as being the foreign object by the moving body determining portion, is detected in the predetermined section, an instruction to stop the operation of the robot, or an instruction to stop the operation of the robot as well as an instruction to stop a portion of the robot system which is necessary to enable the person to enter therein, are outputted.

7. The robot system according to claim 1, wherein if the image processing unit loses sight of the person before it detects that the person has exited the predetermined section, an instruction to stop the operation of the robot, or an instruction to stop the operation of the robot as well as an instruction to stop a portion of the robot system which is necessary to enable the person to enter therein, are outputted.

8. The robot system according to claim 1, wherein the image processing unit includes a moving body determining portion, and wherein if the moving body determining portion determines that a moving body in the predetermined section is the person before the signal output unit outputs the entry permission signal, an instruction to stop the operation of the robot, or an instruction to stop the operation of the robot as well as an instruction to stop a portion of the robot system which is necessary to enable the person to enter therein, are outputted.

9. The robot system according to claim 2, wherein the signal output unit includes at least one of a first output portion which outputs the entry permission signal and a second output portion which outputs the entry disabling signal, and a third output portion which outputs the entry preparation signal,
in the case where the signal output unit includes only the first output portion and the third output portion, the fact that the first output portion does not output the entry permission signal, means that the person is not permitted to enter the predetermined section, and the first output portion and the third output portion are disposed such that they are recognizable to the person,
in the case where the signal output unit includes only the second output portion and the third output portion, the fact that the second output portion does not output the entry disabling signal, means that the person is permitted to enter the predetermined section, and the second output portion and the third output portion are disposed such that they are recognizable to the person, and
in the case where the signal output unit includes the first output portion, the second output portion, and the third output portion, the first output portion, the second output portion, and the third output portion are disposed such that they are recognizable to the person.

10. The robot system according to claim 3, wherein the stopping position is taught as a space of predetermined size, and wherein, when the image processing unit detects that the robot has stopped its operation in the space, it is considered that the robot has stopped at the stopping position.

11. The robot system according to claim 9, wherein the entry permission signal, the entry disabling signal, or the entry preparation signal is outputted either visually or audibly, or both such that they are different from one another.

12. A robot system including a robot which is provided in a robot operating section and a robot controller which controls the operation of the robot in the robot operating section, comprising:
an imaging unit for imaging a predetermined section which includes at least a portion of the robot operating section;
an image processing unit which processes images taken by the imaging unit;
an entry request unit which is to be operated when a person requests to enter the predetermined section; and
a signal output unit which outputs, depending on a processing result of the image processing unit, an entry preparation signal indicating an entry preparation state for receiving the operation of the entry request unit, and an entry permission signal indicating that, in a case where the entry request unit has requested the person to enter the predetermined section, the person is permitted to enter the predetermined section;
wherein if the image processing unit detects that the operation of the robot has been stopped at a previously taught stopping position, only when the person previously requests to enter the predetermined section using the entry request unit, the entry preparation signal is outputted from the time the entry is requested, and at the time of detecting the stopping of the operation of the robot at the previously taught stopping position, an instruction to stop the operation of the robot, or an instruction to stop the operation of the robot as well as an instruction to stop a portion of the robot system which is necessary to enable the person to enter therein, are outputted, and the signal output unit outputs the entry permission signal.

* * * * *